Aug. 3, 1937.  E. VAN DEN BERGHEN  2,088,934
STATIC ELECTRIC MACHINE
Filed May 11, 1936
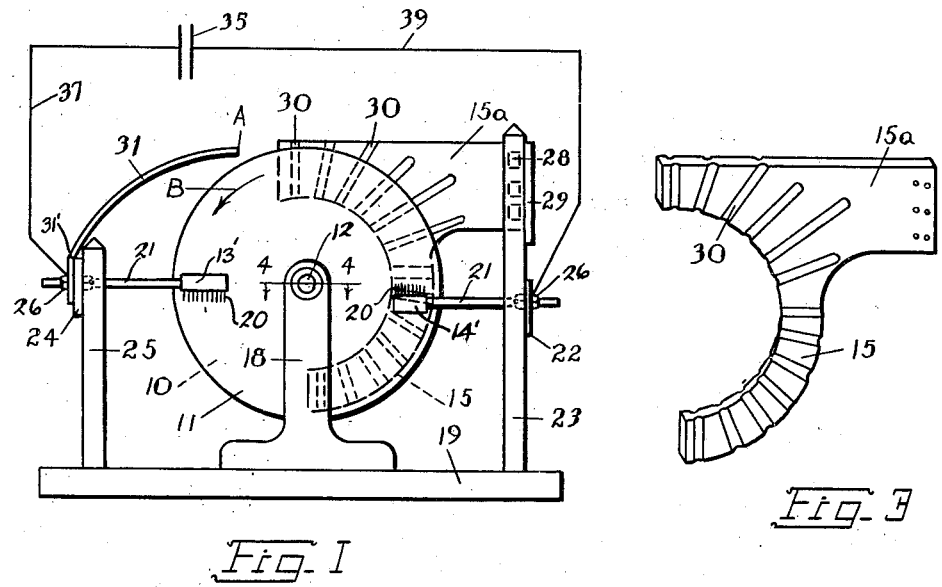
Fig. 1
Fig. 3
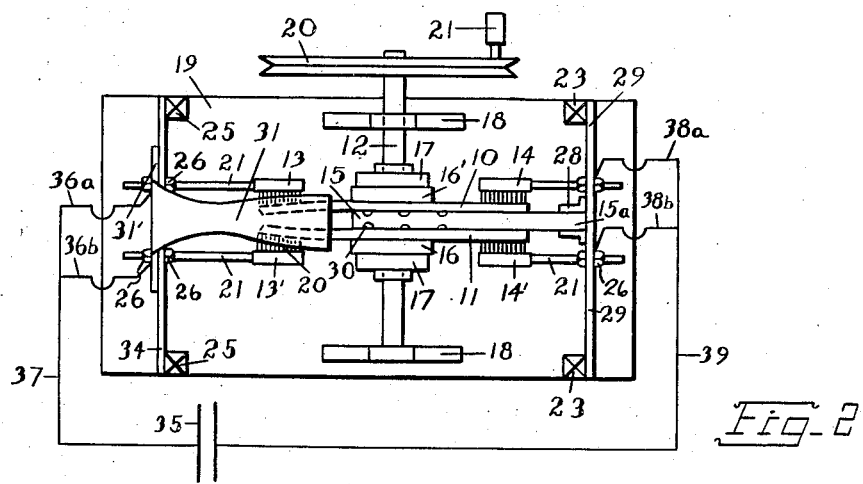
Fig. 2
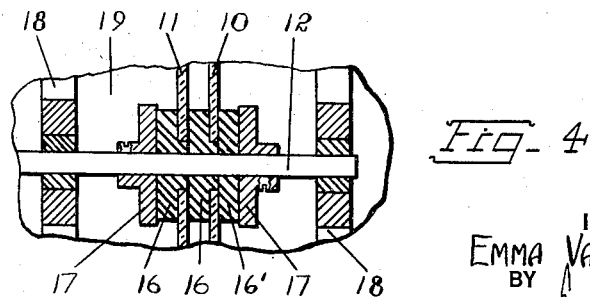
Fig. 4
INVENTOR
EMMA VAN DEN BERGHEN
BY
ATTORNEY Patented Aug. 3, 1937

2,088,934

UNITED STATES PATENT OFFICE 2,088,934

STATIC ELECTRIC MACHINE

Emma Van den Berghen, New York, N. Y.

Application May 11, 1936, Serial No. 78,967

7 Claims. (Cl. 171—328)

This invention relates to new and useful improvements in a static electric machine.

Specifically, the invention proposes the static electricity collector discs to be of celluloid or similar material, and to associate a novel cork separator between these discs in a specific manner.

Heretofore static electric machines have been produced which had little or no commercial value because of their inherent unreliability. In the past it was general to construct the static electric gathering discs of glass, hard rubber and other similar materials. These materials are highly objectionable since they are either hydroscopic or have the quality of collecting moisture. This is particularly true on damp and foggy days. Therefore during such periods the devices are either useless or highly inefficient.

Attempts have been made to overcome these defects by the use of mica, but they have failed for several reasons. In the first place mica is very brittle and flaky and it therefore was necessary that a composition be made which included the mica. Shellac was usually used for this composition. It soon became apparent that the ability of static machines thus constructed to deliver electricity was much smaller than the prior machines which used glass. If the shellac was used in sufficiently small quantities so as not to interfere with the gathering of the static electricity to a great extent, then the mica was sufficiently exposed to chip and break. Furthermore it has been established that mica is not as good a collector as glass.

After a long series of experiments I have discovered that celluloid is an ideal material for a static electric machine. I have also found that the celluloid is quite flexible and the static electricity has a tendency to cause the discs to attract each other and so touch. I have overcome this deficiency by the use of a cork separator disposed between the discs and extended substantially through a distance of 180° and arranged with a plurality of grooves or passages on its surface through which the air may circulate and from which the static electricity may be drawn.

A further object of this invention is to so arrange the cork separator that it is located wholly in one potential of the disc. It is known that the discs develop a positive potential on half of their peripheral surface and a negative potential over the other half. The placing of the cork separator in one of these potentials has proved the most efficient system.

I have arrived at the selection of cork as the separator after experimenting with many other materials. I realize that the cork also develops frictional electricity which supplements the static electricity developed by the discs.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:—

Fig. 1 is a side elevational view of a static electric machine constructed according to this invention.

Fig. 2 is a plan view of Fig. 1.

Fig. 3 is a perspective view of the cork separator.

Fig. 4 is a fragmentary horizontal sectional view taken on the line 4—4 of Fig. 1.

The static electric machine comprises a pair of closely spaced celluloid discs 10 and 11 mounted on a driven shaft 12. A pair of collecting conductor combs 13 and 13' engage the outer sides of the discs at certain peripheral portions thereof. A second pair of collector conductor combs engage the outer sides of said discs and peripheral portions spaced at substantially 180° from the positions of the first pair of the combs. An arcuate cork member 15 is mounted between the peripheral portions of the discs and extends substantially through 180° and straddles one of said pair of combs.

The discs 10 and 11 are mounted on several cork bushings 16 and 16'. These cork bushings are clamped upon the shaft 12 by collars 17. The shaft 12 is supported in a pair of standards 18 which are mounted on a baseboard 19. A large pulley 20 is fixed upon one end of the shaft 12 by which the machine may be mechanically driven. This pulley is also provided with a handle 21 by which the machine may be manually driven if so desired.

Each of the collector combs includes a body portion from which metallic cloth fringes 20 project. These fringes engage the sides of the collector discs. The combs are arranged radially of the discs. Each of the combs is supported on a rod 21 which is adjustably mounted on a fixed support. One of these supports is indicated by reference numeral 22 and is shown mounted across a pair of posts 23 mounted upon one of the ends of the baseboard 19. Nuts 26 threadedly engage portions of each of the rods 21 on opposite sides of the supports. These nuts may be loosened and shifted along the rods and clamped against the faces of the supports to extend or retract the rods. The purpose of adjusting the positions of the combs is that they may be set for the machine to operate at the greatest possible efficiency. If they are extended too close to the centers of the discs there is a tendency for leakage of the potentials to occur from the high to the low potential.

The member 15 has an arcuate shaped portion which engages in between the discs 10 and 11 and extends substantially through 180°. A foot portion 15a projects from the member 15 and is attached by several brackets 28 to a support 29 which is mounted between the posts 23. The member 15 is formed with a plurality of radial grooves 30 on both sides thereof. It is through these grooves that the air is forced to circulate during the rotation of the discs. This member 15 prevents the electrical attraction of the discs from causing them to touch. Furthermore, during the rotation of the discs the portions which are not separated by the member 15 will naturally be forced into parallel planes and thus any tendency which may exist for them to touch when the machine is not operating will be eliminated.

An electric conductor 31 is supported at one end upon the support 24 and extends over to the periphery of the discs. Specifically, the electric conductor has a base portion 31' which is clamped down by certain of the nuts 26 so that the conductor is electrically connected with the combs. The conductor 31 extends to a point A (see Fig. 1) which is a short distance from the peripheries of the discs and also a short distance from one of the ends of the member 15. The discs should be rotated so that the periphery travels towards the ends of the conductor 31. This direction of rotation is indicated by the arrow B in Fig. 1.

In operation the shaft 12 is driven so that the discs 10 and 11 are turned. The speed of rotation of these discs control the volume and character of the electric force produced. The combs 13 and 13' will collect one potential, and the combs 14 and 14' another potential. Preferably, these potentials should be connected with a collector such as a condenser 35. This is accomplished by leads 36a and 36b from the combs 13 and 13' connecting with a lead 37 to one side of the condenser 35. The combs 14 and 14' are connected with leads 38a and 38b which are connected with a lead 39 connected to the other side of the condenser 35.

The static electric machine may be used to build up charges in condensers and for other purposes. Instead of a condenser an electric motor may be connected in its place and the generator will drive the motor. The electric conductor 31 will assist in collecting current of the same potential as the combs 13 and 13'. This is accomplished by sparks which will jump from the peripheries of the discs to the electric conductor. This electric conductor also helps to maintain the potential relation of the static electricity on the discs.

While I have illustrated and described my invention with some degree of particularity, I realize that in practice various alterations therein may be made. I therefor reserve the right and privilege of changing the form of the details of construction or otherwise altering the arrangement of the correlated parts without departing from the spirit or the scope of the appended claims.

Having thus described my invention, what I claim as new, and desire to secure by United States Letters Patent is:—

1. In a static electric machine, a pair of closely spaced flexible non-conductor static electricity collector discs mounted on a driven shaft, a pair of collecting conductor combs engaging the outer sides of said discs at peripheral portions thereof, a second pair of collecting conductor combs engaging the outer sides of said discs at peripheral portions thereof and spaced substantially 180° from said first pair of combs, and an arcuate non-conductor non-static electricity collector member mounted between the peripheries of said discs and extending substantially through 180° and straddling one of said pair of combs.

2. In a static electricity machine, a pair of closely spaced celluloid discs mounted on a driven shaft, a pair of collecting conductor combs engaging the outer sides of said discs and peripheral portions thereof, a second pair of collecting conductor combs engaging the outer sides of said discs and peripheral portions thereof and spaced substantially 180° from said first pair of combs, and a cork member mounted between portions of the peripheries of said discs.

3. In a static electricity machine, a pair of closely spaced celluloid discs mounted on a driven shaft, a pair of collecting conductor combs engaging the outer sides of said discs and peripheral portions thereof, a second pair of collecting conductor combs engaging the outer sides of said discs and peripheral portions thereof and spaced substantially 180° from said first pair of combs, and a cork member mounted between portions of the peripheries of said discs, said member being of arcuate shape.

4. In a static electricity machine, a pair of closely spaced celluloid discs mounted on a driven shaft, a pair of collecting conductor combs engaging the outer sides of said discs and peripheral portions thereof, a second pair of collecting conductor combs engaging the outer sides of said discs and peripheral portions thereof and spaced substantially 180° from said first pair of combs, and a cork member mounted between portions of the peripheries of said discs, said member being of arcuate shape, and extending substantially through 180°.

5. In a static electricity machine, a pair of closely spaced celluloid discs mounted on a driven shaft, a pair of collecting conductor combs engaging the outer sides of said discs and peripheral portions thereof, a second pair of collecting conductor combs engaging the outer sides of said discs and peripheral portions thereof and spaced substantially 180° from said first pair of combs, and a cork member mounted between portions of the peripheries of said discs, said member being of arcuate shape, and extending substantially through 180°, and straddling one of said pair of combs.

6. In a static electricity machine, a pair of closely spaced celluloid discs mounted on a driven shaft, a pair of collecting conductor combs engaging the outer sides of said discs and peripheral portions thereof, a second pair of collecting conductor combs engaging the outer sides of said discs and peripheral portions thereof and spaced substantially 180° from said first pair of combs, and a cork member mounted between portions of the peripheries of said discs, and having a plurality of grooves or passages on the surfaces engaging said discs.

7. In a static electricity machine, a pair of closely spaced celluloid discs mounted on a driven shaft, a pair of collecting conductor combs engaging the outer sides of said discs and peripheral portions thereof, a second pair of collecting conductor combs engaging the outer sides of said discs and peripheral portions thereof and spaced substantially 180° from said first pair of combs, and a cork member mounted between portions of the peripheries of said discs, and having a plurality of grooves or passages on the surfaces engaging said discs, said cork member having a plurality of radial passages on its faces engaging said discs.

EMMA VAN den BERGHEN.